US006323260B1

(12) United States Patent
Koski et al.

(10) Patent No.: US 6,323,260 B1
(45) Date of Patent: *Nov. 27, 2001

(54) PROCESS FOR HYDROPHOBICIZING PARTICLES AND THEIR USE IN DISPERSIONS

(75) Inventors: Ahti A. Koski, Wilkesport (CA); Anders H. Johansson, Yardley, PA (US)

(73) Assignees: Bayer Inc., Sarnia (CA); Rhein Chemie Corporation, Trenton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,833

(22) Filed: Nov. 20, 1998

(51) Int. Cl.$^7$ .................................................... C08K 9/06
(52) U.S. Cl. ................................................. 523/213
(58) Field of Search ............................................... 523/213

(56) References Cited

U.S. PATENT DOCUMENTS

| 3,686,219 | 8/1972 | Burke, Jr. ............... 260/33.6 AO |
| 3,689,451 | 9/1972 | Burke, Jr. ............... 260/33.6 AO |
| 3,689,452 | 9/1972 | Burke, Jr. ............... 260/33.6 AO |
| 3,694,398 | 9/1972 | Burke, Jr. ............... 260/33.6 AO |
| 3,700,690 | 10/1972 | Burke, Jr. ............... 260/33.6 AO |
| 3,716,513 | 2/1973 | Burke, Jr. ............... 260/33.6 AO |
| 4,110,240 | 8/1978 | Leo et al. ...................... 252/182 |
| 4,530,894 * | 7/1985 | Imamura ..................... 430/106.6 |
| 4,713,411 | 12/1987 | Kanou et al. ................... 524/560 |
| 4,845,004 * | 7/1989 | Kobayashi ..................... 430/110 |
| 5,013,585 * | 5/1991 | Shimizu ........................ 427/220 |
| 5,486,420 * | 1/1996 | Nishihara ...................... 428/405 |
| 5,914,210 * | 6/1999 | Demizu ......................... 430/110 |

OTHER PUBLICATIONS

"Wet Grinding", Ullmann's Encyclopedia of Industrial Chemistry, vol. B2, Sec. 5–36.

* cited by examiner

Primary Examiner—Paul R. Michl
(74) Attorney, Agent, or Firm—Joseph C. Gil; Noland J. Cheung (57) ABSTRACT

Particles are hydrophobicized by treatment with a compound containing amino and silane groups. The invention is particularly useful for treating hydrophilic inorganic particles. The treated particles can be used, for example, as a compound agent for polymers. The production and use of a predispersion or concentrate comprising a major amount of the treated particles and a binder is also described.

44 Claims, 1 Drawing Sheet

FIG. 1

PROCESS FOR HYDROPHOBICIZING PARTICLES AND THEIR USE IN DISPERSIONS

BACKGROUND OF THE INVENTION

1. Field of the Invention

In one of its aspects, the present invention relates to the hydrophobizing of particles, particularly inorganic water-insoluble compounds. In another of its aspects, the present invention also relates to the treated particles, pe. The treated particles are useful particularly, but not exclusively in the compounding of polymers, especially rubbers and plastics. In another of its aspects, the present invention also relates to dispersions of the treated particles in a polymer-containing matrix (binder) and to a process for preparing such dispersions.

2. Description of the Prior Art

Raw polymers, either rubbers or plastics rarely have the inherent physical or chemical properties in their pure state that are necessary to make useful articles. The polymers must thus be further compounded by mixing with additional ingredients or "additives". Polymer additives may include one or more of: secondary polymers; extender oils; fillers; antioxidants; coloring pigments, stabilizers, flame retardants, processing aids and other ancillary chemicals. For rubbers, this list may be extended to include curatives (vulcanizing agents) such as sulfur or organic peroxides; cure accelerators such as dibenzothiazyl disulphide (MBTS) and tetramethylthiuram disulfide (TMTD), as well as inorganic cure activators such as zinc oxide, lead monoxide (PbO, litharge), red lead ($Pb_3O_4$), and the like. Regardless of whether it is plastic or rubber properties in which improvement is sought, the selected additive materials must be mixed intimately with the polymer at the compounding stage (so as to obtain a homogeneous dispersion) in order for the maximum improvements to be realized. Conventionally, this mixing is usually accomplished on an open mill, in a mixing extruder or in an internal mixer (such as the Henschel, Welex or Banbury types) using one or more steps until the desired degree of dispersion is achieved.

Quite often, a satisfactory dispersion of the additive in the polymer is difficult to attain in a reasonable time, resulting in inhomogeneity which translates into unacceptable physical properties or appearance in the finished compound. To improve the dispersion, an extended mixing time or multi-stage mixing cycle must be employed which lowers productivity in the mixing plant and is thus undesirable.

Within the industry, it is known that mixing of inorganic chemicals such as the inorganic activators used in the rubber industry presents special difficulties in this regard because of the inherent hardness and much higher viscosity of these chemicals relative to the polymer matrix.

One general method of facilitating mixing and dispersion of these inorganic materials into polymer compounds in the factory is to use a very fine particle size inorganic material. However, this inevitably generates dust during both the material handling and mixing process and in many cases these dust particles are toxic or otherwise unacceptable from a worker health standpoint. Dust losses also change the ratio of the chemicals to the base polymer from what was originally intended; this may lead to poor processing or poor finished properties in the compound. In some specific cases (i.e. with talc), very fine particles may act as a lubricant and actually contribute to poor mixing of the bulk, in this case by reducing the shear which is needed for dispersion. In other cases, especially where polar ingredients must be mixed into a non-polar polymer, agglomeration of the particles may occur during mixing, leading to undesirable inhomogeneity and unsatisfactory physical properties.

To mitigate the above problems, it is well known in the art to add the inorganic chemicals to the base polymer in a predispersed form, e.g., as fine particles bound in a low viscosity medium (or binder) such as polymer or oil, or combinations thereof with additional additives. This bound form of inorganic chemicals overcomes the dust problem in the rubber compounding plant and also greatly shortens the dispersing time of the inorganic materials in the polymer compound, particularly if the binder is chemically similar to the base polymer and the viscosity of the pre-dispersion closely matches that of the rest of the compound. From a compounding standpoint, it is desirable to have the minimum amount of binder that will both facilitate dispersion and eliminate dusting during processing.

These types of 'concentrates' or 'dispersions' thus typically contain from about 50% to 95% by weight of the active inorganic chemical dispersed in a suitable binder (practically, this corresponds to a range of from 100 to 1900 parts by weight of inorganic chemical per 100 parts by weight of binder). Many such materials are commercially available from a number of suppliers to the rubber industries. Non-limiting examples of such commercial polymer-bound materials used in the rubber industry are: RHENOGRAN® ZnO-85 (85 weight percent zinc oxide dispersed in an EPDM/EVA binder); POLY-DISPERSION® PLD-90 (90 weight percent lead monoxide dispersed in polyisobutylene); RHENOGRAN® $Pb_3O_4$-90 (90 weight percent red lead oxide dispersed in EPDM/EVA), all available from Rhein-Chemie Corporation and Rhein Chemie Rheinau GmbH.

Cheaper oil-based binders may also be used; while these address the dust problem, they do not offer as good or as rapid a dispersion as the presence of oil lowers the friction necessary to cause comminution of the inorganic materials during mixing. The presence of oil may also cause other changes in the physical properties (i.e. softening) or appearance (colour) which are undesirable. An example of the latter type of dispersion is Polydex™ PPD (ZnO) 75, a 75 weight percent blend of ZnO in a light process oil, available from Polychem.

In the plastics industry, it is often desired to modify the viscosity (i.e., the "melt index"), hardness, color, light-fastness and/or other properties of the base polymer in order to render it processible or suitable for its intended end-use application. Again, these additives (chemicals), in their pure form, may be added directly to the bulk plastic during the processing (compounding) phase; although, it is more customary to use the materials as concentrates in liquid or pellet form in order to obtain better dispersion and better control of the process. Again, these concentrates consist of a dispersion of fine particles of the additive in a suitable carrier or 'binder' which may be similar or identical to the base polymer, or it may be another compatible polymer or a combination of polymers and oil. Also, other ingredients (e.g., soaps, compatibilizing agents and dispersing aids) may be included in the base of the binder. This concentrate form is used almost exclusively for introducing inorganic colorants into plastics where the high hardness and high melting point of the additives causes dispersion problems. Many companies currently supply inorganic and organic additive concentrates to the plastics industry; non-limiting examples of the latter materials include: ComPETe™, CELPRO™, Holoflake™, Hanna-FX™(M.A. Hanna Color), BARKOLEN™ (SPUR™ a.s.), POLYPLUS™ (PolyTech South Inc.), CEK CONCENTRATES™, COLORPLAST™, CONCORDE™ (C.E.K. Concentrates) and the like.

Conventionally, these pre-dispersed forms of inorganic additives for use in the rubber and plastics industries have been produced by dry mechanical mixing or the ingredients—i.e., the additive in question is simply mechanically mixed with the binder material. Unfortunately, this approach serves only to transfer the mixing and dust problems from the compounders plant to that of the supplier of the dispersion. Moreover, the relatively high percentage of inorganic material to binder desirable in these dispersions moreover requires long mixing times or the use of special high energy mixing equipment (HIDM) which either lowers productivity or adds to the production costs. What would be most desirable is a dispersion manufacturing process that could be made essentially dust-free and moreover required little mixing energy to disperse the inorganic ancillary material in a polymeric binder.

A facile known method to prepare fine particle size materials from coarser commercially available ones is by wet grinding, using either a ball, colloid or steam jet mill or other equipment as described under "Wet Grinding" in Ullmann's Encyclopedia of Industrial Chemistry Vol. B2 sec. 5-36, the contents of which are hereby incorporated by reference. As the fine particles produced are continuously in a wet state, they have little tendency to become airborne dust. However, the concentration of the fine particles in the wetting medium is of necessity low in order to maintain the fluidity required for satisfactory grinding and thus the particles must be insoluble in the grinding medium. Where media other than water is employed during the size reduction process, additional hazards such as flammability must be taken into consideration. Further, the resulting dispersions typically require concentration (i.e., solvent removal) before they can be further dispersed in a binder. Moreover, it is difficult to dry such fine particles without generating dust elsewhere in the process or without causing agglomeration (particle growth) during the drying step. Where possible, it would be preferable to produce masterbatches, dispersions and concentrates of these particles in suitable binders while the particles are still in a finely divided wet state. It is also preferable for economy and safety perspectives that the grinding medium be water. An additional benefit of using water is that it is generally a non-solvent for most of the organic and inorganic additives which are sold as dispersions.

A number of prior art references teach how to make "masterbatches" of fillers and dispersions of other chemicals in polymers by using fine particles dispersed in an aqueous state. For instance, Burke (U.S. Pat. Nos. 3,689,451, 3,689,452, 3,700,690, 3,716,513 and 3,840,382, the contents of each of which is hereby incorporated by reference) teaches how to use an aqueous dispersion of never-dried alkali silica pigment or a mixture of an aqueous dispersion of never-dried alkali silica pigment silica and carbon black to make a dispersion of these fillers in a matrix of rubbers at levels of <100 phr of filler. The rubbers must be used as solutions in water-immiscible solvents. Typically, large amounts of ancillary chemicals must also be employed to ensure transfer of the silica from the water suspension into the organic phase. In related patents (U.S. Pat. Nos. 3,686,219 and 3,694,398, the contents of each of which are hereby incorporated by reference) Burke teaches how to prepare similar dispersions from finely (aqueous) dispersed particles of silica by using the rubber in the form of a water emulsion—i.e., a latex. Nonetheless, all of the above Burke patents are restricted to the use of never-dried silica or combinations of never-dried silica and carbon black (i.e., conventional rubber fillers). The levels of the inorganic material in the finished dried masterbatch is moreover restricted a low concentration and the binder is restricted to elastomers. To the knowledge of the inventors, no commercial masterbatches made by the Burke methods are currently available.

Contrary to the apparent commercial unavailablity of silica masterbatches, masterbatches of carbon black and rubbers prepared from both water emulsions of polymers (i.e., the latex as resulting from emulsion polymerization) and solutions of polymers in hydrocarbons (i.e., as resulting when the polymer is soluble in the polymerization medium) have been available from several suppliers for a number of years (Copolymer Div. of DSM; Bayer Inc.; Goodyear etc.,). These masterbatches are usually prepared by grinding the carbon black in a wet aqueous state and then intensively mixing the black slurry with a solution-polymer "cement" or emulsion polymer latex, with or without added oil, followed by coagulation and drying. In all commercial products, the levels of black filler are <100 phr.

Where the polymer is available as an aqueous emulsion (i.e., latex), various methods are available for the incorporation of ancillary chemicals to form dispersions; the coprecipitation methods of Leo and Johansson (U.S. Pat. No. 4,110,240) may be used to prepare concentrates containing 80–99.5 wt % of the ancillary chemicals (excluding fillers), either organic or inorganic in the polymeric binder. Kanou et al. (U.S. Pat. No. 4,713,411) detail a different coprecipitation process to produce a pigment composition by using a special water-soluble polymeric binder which is then rendered insoluble by pH changes. However, many polymers, especially plastics, are prepared by a solution polymerization process and are not readily available in a latex form.

Thus, despite previous efforts in the prior art, there remains a need for an efficient manner of producing dispersions or concentrates of inorganic additive materials in a binder wherein the additive is present as the major component (i.e., 50 percent by weight or more) of the dispersion or concentrate and the binder is a polymer which is not readily available in a latex form.

SUMMARY OF THE INVENTION

It is an object of the present invention to obviate or mitigate at least one of the above-mentioned disadvantages of the prior art.

It is another object of the present invention to provide a novel, relatively hydrophobic particulate material.

It is yet another object of the present invention to provide a novel process for treating particulate material to render it relatively hydrophobic.

It is yet another object of the present invention to provide a novel dispersion comprising a polymer and a relatively hydrophobic particulate material.

It is yet another object of the present invention to provide a novel process for producing a dispersion comprising a polymer and a relatively hydrophobic particulate material.

Accordingly, in one of its aspects, the present invention provides a process for treating particles to render them hydrophobic, the process comprising the step of:

contacting the particles with a compound of Formula I:

(I)

or an acid addition or quaternary ammonium salt thereof, in which:

at least one of $R^1$, $R^2$ and $R^3$, preferably two of $R^1$, $R^2$ and $R^3$ and most preferably $R^1$, $R^2$ and $R^3$ are hydroxyl or hydrolysable groups;

$R^4$ is a divalent group that is resistant to hydrolysis at the Si—$R^4$ bond;

$R^5$ is selected from: hydrogen; a $C_{1-40}$ alkyl; a $C_{2-40}$ mono-, di- or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 8 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6, and is preferably 4.

In another of its aspects, the present invention provides a treated particulate material comprising particles having bound thereto an aminohydrocarbonsiloxane (e.g., an (aminoalkyl)siloxane) moiety—i.e., a hydrocarbon moiety comprising both silicon and nitrogen.

Preferably, the aminohydrocarbonsilane moiety has the formula in which:

$R^a$, $R^b$ and $R^c$ are the same or different and each is selected from —O— and —$C_pH_{2p}$—, optionally substituted by one or more oxygen atoms and wherein p is an integer of from 1 to 10; and

$R^{12}$ is a group of formula:

or an acid addition or quaternary ammonium salt thereof in which:

$R^4$ is a divalent group that is resistant to hydrolysis at the Si—$R^4$ bond;

$R^5$ is selected from: hydrogen; a $C_{1-40}$ alkyl; a $C_{2-40}$ mono-, di- or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 8 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6, and is preferably 4.

In yet another of its aspects, the present invention provides a particulate material comprising particles having: (i) bound thereto an aminohydrocarbonsiloxane (e.g., an (aminoalkyl)siloxane) moiety (i.e., a hydrocarbon moiety comprising both silicon and nitrogen), and (ii) a contact angle of at least about 100°. Preferably, the aminohydrocarbonsilane moiety has the formula set out hereinabove. Preferably, the particles have a contact angle of at least about 110°, more preferably in the range of from about 115° to about 160°, even more preferably in the range of from about 120° to about 150°, most preferably in the range of from about 120° to about 140°. In contrast, the contact angle of particles which are not treated in accordance with the present process is typically 75°.

The contact angle of the particles with water may be readily determined according to the following procedure:
(i) double-sided tape is attached to a probe (e.g., a stirrup) and coated with the particulate material by immersing the tape in a sample of the particulate material;
(ii) excess powder is removed by gentle tapping and large powder clusters are removed by careful wiping;
(iii) the probe coated with particulate material is immersed into distilled water using a conventional contact angle analyzer (e.g., a Cahn Dynamic Contact Angle Analyzer) at a rate of 100 microns per second.
This procedure results in determination of the advancing contact angle of the particles.

In yet another of its aspects, the present invention provides a particulate material produced by contacting the particles with a compound of Formula I:

(I)

or an acid addition or quaternary ammonium salt thereof, in which:

at least one of $R^1$, $R^2$ and $R^3$, preferably two of $R^1$, $R^2$ and $R^3$ and most preferably $R^1$, $R^2$ and $R^3$ are hydroxyl or hydrolysable groups;

$R^4$ is a divalent group that is resistant to hydrolysis at the Si—$R^4$ bond;

$R^5$ is selected from: hydrogen; a $C_{1-40}$ alkyl; a $C_{2-40}$ mono-, di- or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 8 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6, and is preferably 4.

In yet another of its aspects, the present invention provides a dispersion comprising a polymer and treated particulate material;

wherein the treated particulate material comprises particles having bound thereto an aminohydrocarbonsiloxane moiety comprising both silicon and nitrogen.

Preferably, the present process of treating a particulate material is carried out in an aqueous solution, suspension or slurry, so that the product of the process is an aqueous suspension or slurry of hydrophobicized mineral particles.

In one preferred embodiment, the suspension or slurry resulting from the present process, and containing the treated particles, is then mixed with a hydrocarbon solution of a polymer, and then dried to form a polymer-particle dispersion. Owing to the hydrophobicized nature of the treated particles, they are well dispersed in the polymer. This preferred embodiment results in the in situ production of a dispersion comprising the polymer and the treated particles. By "in situ production" is meant that treated particles are incorporated into a suspension without being isolated (i.e., separated from the suspension or slurry, and subsequently dried). This preferred embodiment is believed to be the first in situ production of a dispersion comprising a polymer and a treated particulate material (such as metal oxides and the like will be discussed in more detail hereinbelow), the dispersion having been prepared from a polymer solution.

Alternatively, the treated particulate material may be separated from the suspension or slurry, and subsequently dried for later use (i.e., before addition of the polymer solution).

In this specification, the terms "concentrate", "dispersion" and "pre-dispersion", when used in the context of the present invention, are intended to mean a composition comprising a particulate material (i.e., the additive(s) to be used for compounding purposes) and a binder therefor, wherein the particulate material is the major component of the composition—i.e., the composition comprises at least about 50 percent by weight particulate material. Preferably, the composition comprises from about 50 to about 95, more preferably from about 60 to about 95, even more preferably from about 70 to about 95, percent by weight particulate material.

BRIEF DESCRIPTION OF THE DRAWING

Embodiments of the present invention will be described with reference to the accompanying drawing, in which.

DETAILED DESCRIPTION OF THE PREFERRED EMBODIMENTS

Throughout this specification, reference is made to the treatment of particles. The present invention is particularly useful to the treatment of inorganic water insoluble compounds. Preferably the inorganic water insoluble compounds useful for treatment are those such compounds which contain oxygen, more preferably such compounds which also contain a metal. Preferably, the metal is selected from Groups II–VIII of the Periodic Table of Elements (Group II hydroxide and carbonate compounds). Examples of suitable groups of useful metal compounds may be selected from the group comprising oxides, hydroxides, borates, sulfates, carbonates, silicates, phosphates, chromates and the like. Non-limiting examples of suitable metal compounds may be selected from the group comprising titanium oxide, ferric oxide, hydrated ferric oxide, ferrous oxide, antimony oxide, barium carbonate, zinc oxide, zinc borate, lead oxide (including red lead oxide), dibasic lead phosphite, lead silicate, tribasic lead sulfate and mixtures thereof. Other suitable metal compounds, especially those which are water insoluble or only slightly soluble in water, will be readily apparent to those of skill in the art base on the foregoing discussion. For example, a particularly preferred application of the present invention is to hydrophobicize colorant or pigment particles which are typically used in the plastics industry. Non-limiting examples of suitable such particles may be selected from the group consisting of $\alpha$-FeOOH (goethite), $\gamma$-FeOOH (lepidocrocite), $\alpha$-Fe$_2$O$_3$ (hematite), $\gamma$-Fe$_2$O$_3$ (maghemite) and Fe$_3$O$_4$.

In a preferred embodiment, the treatment is carried out in an aqueous dispersion or slurry of the particles. Generally, the precise make up of the slurry is not particularly restricted provided that it is a mobile suspension. Practically, it is preferred that the slurry contain up to about 60% by weight, more preferably up to about 50% by weight, of particles to be treated. While the physical nature of the particles to be treated is not particularly restricted, it is preferred that they have an average particle size in the range of from about 0.1 $\mu$m to about 100 $\mu$m, preferably from about 10 $\mu$m to about 50 $\mu$m, most preferably from about 10 $\mu$m to about 25 $\mu$m.

It is desirable that, prior to the addition to the particles of the compound of Formula I, the dispersion or slurry shall have a pH in the range from 6 to about 8, more preferably from about 6.8 to about 7.2. The pH can be adjusted by addition of acid or alkali, for example mineral acid, alkali metal hydroxide, alkaline earth hydroxide, ammonium hydroxide and the like. These can be added as such or in aqueous solution.

Preferably, the compound of Formula I comprises the following formula:

(I)

or an acid addition or quaternary ammonium salt thereof, in which:

at least one of $R^1$, $R^2$ and $R^3$, preferably two of $R^1$, $R^2$ and $R^3$ and most preferably $R^1$, $R^2$ and $R^3$ are hydroxyl or hydrolysable groups;

$R^4$ is a divalent group that is resistant to hydrolysis at the Si—$R^4$ bond;

$R^5$ is selected from: hydrogen; a $C_{1-40}$ alkyl; a $C_{2-40}$ mono-, di- or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 8 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_{6-40}$ aryl group, an oxygen atom and a sulfur atom, and t and v are each independently 1, 2, 3 or 4; provided that the sum of t and v does not exceed 6, and is preferably 4.

In the compound of Formula I, it is preferred that all three of the groups $R^1$, $R^2$ and $R^3$ are readily hydrolysable. Suitable groups $R^1$ include hydroxyl groups, acetate groups and hydrolysable groups of formula $OC_pH_{2p+1}$, where p has a value from 1 to 10. The alkyl chain can be interrupted by oxygen atoms, to give groups, for example, of formula $CH_3OCH_2O—$, $CH_3OCH_2OCH_2O—$, $CH_3(OCH_2)_4O—$, $CH_3OCH_2CH_2O—$, $C_2H_5OCH_2O—$, $C_2H_5OCH_2OCH_2O—$, or $C_2H_5OCH_2CH_2O—$. Other suitable hydrolysable groups include phenoxy, acetoxy, chloro, bromo, iodo, ONa, OLi, OK or amino or mono- or dialkylamino, wherein the alkyl group(s) have 1 to 30 carbon atoms.

$R^2$ and $R^3$ can take the same values as $R^1$, provided that only one of $R^1$, $R^2$ and $R^3$ is chloro, bromo or iodo. Preferably, only one or two of $R^1$, $R^2$ and $R^3$ is hydroxyl or ONa, OLi or OK.

Non-limiting examples of groups $R^2$ and $R^3$ that are not hydrolysable include $C_{1-10}$ alkyl, $C_{2-10}$ mono- or diunsaturated alkenyl, and phenyl. $R^2$ and $R^3$ can also each be a group —$R^4$—$NR^5R^6$, discussed further below.

It is preferred that $R^1$, $R^2$ and $R^3$ are all the same and are $CH_3O—$, $C_2H_5O—$ or $C_3H_8O—$. Most preferably they are all $CH_3O—$.

The divalent group $R^4$ is preferably such that N-$R^4$-Si is of the formula:

in which k, m, n, o and p are all whole numbers. The order of the moieties between N and Si is not particularly restricted other than neither N or 0 should be directly bound to Si. The value of k is 0 or 1, the value of m is from 0 to 20 inclusive, the value of n is 0, 1 or 2, the value of o is 0 or 1 and the value of p is from 0 to 20 inclusive, with the provisos that the sum of the values of k, m, n, o and p is at least 1 and not more than 20 and that if o is 1, p is 1 or greater and the sum of k, m and n is 1 or greater, i.e. that the Si atom is linked directly to a carbon atom. There should be no hydrolysable bond between the silicon and nitrogen atoms. Preferably, m is 3 and 1, n, o and p are all 0, i.e., $R^4$ is —$CH_2CH_2CH_2$—.

Preferred compounds of Formula I include those in which $R^5$ is hydrogen and $R^6$ is an alkenyl group selected from the group comprising soya alkyl, tall oil alkyl, stearyl, tallow alkyl, dihydrogenated tallow alkyl, cocoalkyl, rosin alkyl, palmityl and derivatives of these which include one or more unsaturations. Various of these preferred compounds of Formula I may be produced, for example, by the process described in International patent application S.N. PCT/CA98/0500 [Koski], the contents of which are hereby incorporated by reference. Generally, this copending patent application relates to a process for producing the following preferred compounds of Formula I:

wherein $R^1$ is a $C_6$–$C_{40}$ alkyl or alkenyl group that is straight-chained or branched, a $C_6$–$C_{40}$ aryl group, a $C_7$–$C_{40}$ aralkyl group or a group $R_5A(CH_2)_p$ wherein $R_5$ is a $C_6$–$C_{30}$ alkyl or alkenyl group that is straight-chained or branched, p is an integer from 2 to 6 and A is O or NH;

$R^2$ is a $C_1$–$C_{12}$ alkyl group (preferably a $C_1$–$C_5$ alkyl group) or a $C_3$–$C_2$ alkenyl group (preferably a $C_3$–$C_5$ alkenyl group);

$R^3$ is a $C_1$–$C_{12}$ alkyl group (preferably a $C_1$–$C_5$ alkyl group), a $C_1$–$C_{12}$ alkoxy group (preferably a $C_1$–$C_5$ alkoxy group), a $C_2$–$C_{12}$ alkenyl group (preferably a $C_2$–$C_5$ alkenyl group) or a $C_3$–$C_{12}$ alkenyloxy group (preferably a $C_3$–$C_5$ alkenyloxy group);

$R^4$ has the same definition as $R^3$ and may be the same as $R^4$ or different;

$R^6$ is a divalent alkylene group having up to 10 carbon atoms and is optionally interrupted one, two or three times by a phenylene group; and

X is an anion;

the process comprising the step of:

(a) reacting a compound of the Formula II:

$$R^1\text{—}NH_2 \qquad (II)$$

wherein $R^1$ is as defined above, with a compound of Formula III:

$$(III)$$

wherein $R^2$, $R^3$, $R^4$, $R^6$ and X are as defined above, in the absence of a solvent; or (b) reacting a compound of the Formula IV:

$$R^1\text{—}X \qquad (IV)$$

wherein $R^1$ and X are as defined above, with a compound of Formula V:

$$(V)$$

wherein $R^2$, $R^3$, $R^4$ and $R^6$ are as defined above, in the absence of a solvent.

It is preferred that at least one of $R^4$, $R^8$ and $R^9$ has a chain of at least 8 carbon atoms, more preferably at least 10 carbon atoms, uninterrupted by any heteroatom.

The compound of Formula I can be used as the free base, or in the form of its acid addition or quaternary ammonium salt, i.e.

wherein $R^1$, $R^2$, $R^3$, $R^4$, $R^5$ and $R^6$ are as defined above; $R^7$ is selected from: hydrogen, a $C_{1-40}$ alkyl group or $C_{2-40}$ mono-, di- or tri-unsaturated alkenyl group, and X is an anion. X is suitably acetate, chlorine, bromine, or sulphate, of which chlorine and bromine are preferred, and $R^7$ is preferably hydrogen.

Non-limiting examples of suitable salts of compounds of Formula I may be selected from the group comprising N-oleyl-N-[(3-triethoxysilyl)propyl] ammonium chloride, N-3-aminopropylmethyldiethoxy-silane hydrobromide, (aminoethylaminomethyl)phenyltrimethoxysilane hydrochloride, N-[(3-trimethoxysilyl)propyl]-N-methyl, N-N-diallylammonium chloride, N-tetradecyl-N,N-dimethyl-N-[(3-trimethoxysilyl)propyl] ammonium bromide, 3[2-N-benzylaminoethylaminopropyl] trimethoxysilane hydrochloride, N-octadecyl-N,N-dimethyl-N-[(3-tri-methoxysilyl)propyl] ammonium bromide, N-[(trimethoxysilyl)propyl]-N-tri(n-butyl) ammonium chloride, N-octadecyl-N-[3-triethoxysilyl)propyl] ammonium chloride, N-2 -(vinylbenzylamino)ethyl-3-aminopropyl-trimethoxysilane hydrochloride and mixtures thereof. Various of these preferred salt forms of the compound of Formula I may be produced, for example, by the process described in International patent application S.N. PCT/CA98/0500 [Koski], the contents of which are hereby incorporated by reference.

It is preferred to use the compound of Formula I in salt form. The most preferred compound is N-octadecyl-N-[(3-trimethoxysilyl)propyl] ammonium chloride.

The amount of the compound of Formula I may be between 0.1 and 20 percent by weight of the mineral particles in the slurry (dry basis) and preferably between 0.25 and 10 percent by weight and most preferably between 0.5 and 2 percent by weight. Preferably, the amount of the compound of Formula I used varies inversely with the mineral particle size. The chemical nature of the particles being treated also may affect the amount of the compound of Formula I which is used.

The compound of Formula I may be added to the aqueous slurry of particles in its natural state, either as a liquid or a solid. However, to facilitate dispersion, it is preferred where possible to add the compound as a liquid. If the melting point of the compound is below 95° C., it is preferred to add it to the slurry in a molten state at a temperature at least 5° C. above the melting point, provided the temperature of the compound in the liquefied state does not exceed 100° C. and provided that the compound does not decompose under these conditions. If the melting point exceeds 95° C., it is most preferred to use a solvent to dissolve the compound of Formula I. Preferred solvents are water and $C_{1-5}$ alcohols, most preferably $C_{1-3}$ alcohols—e.g., methanol, ethanol, n-propanol, isopropanol and mixtures thereof.

If the compound of Formula I is an alkoxysilane, then most preferably the alkoxy group of the solvent alcohol will be the same as the alkoxy group of the alkoxysilane. For example, if the compound of Formula I is a methoxysilane, the preferred solvent is methanol. Preferably, the concentration of the compound of Formula I in the solvent is in the range of from about 10 to about 90 percent by weight, more preferably in the range of from about 25 to about 75 percent by weight, most preferably about 50 percent by weight.

Preferably, the solution can be prepared and added to the slurry at a temperature in the range of from about 0 °C. to the lower of at least 10° C. below the boiling point of the solvent and 95° C. The dispersion of the compound conveniently may be effected by mixing.

It is preferred that, for the specific compound of Formula I which is added, the equivalent balance (EB) should be calculated. The EB is used to determine whether mineral acid or alkali metal hydroxide, or solution thereof, should be added. The equivalent balance (EB) may be determined from the absolute value of the sum of the group values of X (if present), $R^1$, $R^2$ and $R^3$ and the magnitude of the sum of the group contributions of X (if present), $R^1$, $R^2$ and $R^3$ together with the weight added and the molecular weight of the compound of Formula I, according to the following scheme: The group contribution of X for either X=Cl or X=Br is −1, thus, if X is present, it is given a value of −1. The group contribution of each of $R^1$, $R^2$ and $R^3$ is generally zero for all groups except as follows: if the group is $CH_3COO$, Cl or Br, in which case it is −1, or if it is amine (including an imine), ONa, OK or OLi in which case it is +1. If the sum of the group contributions for X, $R^1$, $R^2$ and $R^3$ is zero, no adjustment with mineral acid or alkali metal hydroxide (or solutions thereof) is necessary. If the sum of the group values is a positive integer, adjustment with mineral acid is desirable, and if it is negative, adjustment with alkali metal hydroxide is desirable.

For example, where $R^1$=$OCH_3$, $R^2$=$CH_3$, $R^3$=Cl and X=Br, the sum of the group values (g.v.) is:

$$\Sigma = (g.v.\ OCH_3) + (g.v.\ CH_3) + (g.v.\ Cl) + (g.v.\ Br) = (0) + (0) + (-1) = -2$$

The negative sign in front of the sum indicates adjustment with alkali metal hydroxide is desirable. The number of equivalents of alkali required is given by the equivalent balance (EB) which includes the absolute value of the sum of the group contributions ($|\Sigma|$) as a scaling factor:

$$EB = \frac{|\Sigma| \times \text{weight in grams of the chemical added}}{\text{molecular weight of the added chemical}}$$

In continuing the example, if a process according to the present invention were scaled so as to require 6,000 grams of a chemical of Formula I with a molecular weight of 350 grams and the sum of the group values gave –2, EB would be calculated as follows:

$$EB = -2 \times 6000/350 = -34.28 \text{ gram-equivalents}$$

Thus, in this example, 34.28 gram-equivalents of alkali metal hydroxide would be added. Sodium hydroxide is the preferred alkali metal hydroxide. The weight of sodium hydroxide would be:

Weight=($EB$)×(Equivalent Weight of NaOH)=34.28×40.0=1371.2 grams

The preferred technique according to the invention is to dissolve the alkali metal hydroxide or mineral acid in water so as to obtain a concentration in the range of from about 5 to about 25 percent by weight, most preferably in the range of from about 5 and about 10 percent by weight prior to adding the solution to the slurry.

The process described thus far provides an aqueous slurry or dispersion of hydrophobicized particles (i.e., it has not yet been contacted with a polymer or other substrate to be filled), which can be used as such or can be filtered and dried.

The hydrophobicized particles may be used as a compounding agent in a multitude of materials including, but not limited to, the following: polymers, alkyd paints, toners such as those used in photocopiers, modified plastics and rubber vulcanizates.

One particularly advantageous application of the hydrophobicized particles is in the production of predispersions or concentrates of polymer compounding chemicals. These materials typical include a chemical of interest which is predispersed in high concentrations (at least about 50 percent by weight as discussed hereinabove)n a binder, preferably a polymeric material, and are supplied in the form of pellets, slabs and the like. Thus, the polymer acts as a binder for the chemical of interest. The chemical of interest may, for example, be a silica filler, a colorant, a pigment, an inorganic activator, a stabilizer and/or a flame retardant for use to produce a polymer-based product.

In a preferred embodiment of this invention the hydrophobicized particles, in the aqueous dispersion or slurry, are incorporated into a binder material, for example a polymer in the form of a polymer solution or cement. The slurry of treated particles is mixed with a hydrocarbon or other non-aqueous solution of the binder. Preferably, the solvent in which the binder is dissolved is immiscible with, or mostly immiscible with, water to form a preblend. This binder solution (e.g., polymer cement) may be made by dissolving the solid polymer in a solvent or, in the case of a solution polymer, it may be the solution resulting from the polymerisation of monomers in the solvent.

Preferably, the binder is a polymer. It will, however, be appreciated by those of skill in the art that the binder may be a quasi- or non-polymeric material such as a polyethylene wax, a rosin, a fatty acid, a high molecular weight liquid and the like, or a combination of polymer and such quasi- or non-polymeric material.

The polymer may be an elastomer (e.g., a hydrocarbon rubber), a graft polymer or block polymer of monomers having at least one ethylenically unsaturated bond and polymerizable through this unsaturation, a plastic and the like.

Elastomers are well known to those of skill in the art. Non-limiting examples of suitable elastomers may be selected from the group comprising natural rubber (NR), depolymerized NR, cis-1,4-polyisoprene rubber (IR), polybutadiene rubber (BR), styrene-butadiene rubber (SBR), acrylonitrile-butadiene rubber (NBR), hydrogenated acrylonitrile-butadiene rubber (HNBR), butyl rubber (IIR), halogenated butyl rubber (HIIR), ethylene-propylene monomer (EPM) rubber, ethylene-propylenediene monomer (EPDM) rubber, chloroprene[1] rubber (CR), ethylene-vinyl acetate (EVM)

[1] Also known as Neoprene™. rubber, silicone rubber (Q), epichlorohydrin (ECO) rubber, urethane rubber (AU EU) and the like.

Plastics are well known to those of skill in the art. Non-limiting examples of suitable plastics may be selected from the group comprising polystyrene, polyethylene, polypropylene, chlorinated polyethylene, acrylonitrile-butadiene-styrene (ABS) polymers, ethylene-vinyl-acetate (EVA) pastic, polyvinyl chloride (PVC), plasticized polyvinyl chloride (PVC), polymethylmethacrylate (PMMA), epichlorohydrin (ECO) plastic and the like.

Of course those of skill in the art will recognize and appreciate that the foregoing materials may be modified with respect to parameters such as monomer sequence, monomer ratio, molecular weight (Mn, Mw, etc.), molecular weight ratio and the like while still being useful in the present invention.

The selection of a suitable solvent for preparation of the polymer binder solution is within the purview of a person skilled in the art and depends on the specific polymer to be dissolved. Non-limiting examples of suitable solvents may be selected from the group comprising cyclohexane, chlorobenzene, hexane, benzene, toluene, pentane and the like. Optionally, processing oil, antioxidants and other chemicals known in the art as processing aids may be added to the hydrocarbon solution prior to mixing with the slurry, or they may be added after mixing the slurry and the polymer solution.

The viscosity of the final polymer solution, sometimes referred to as a polymer cement, containing the optional ingredients, is preferably such that it closely matches the viscosity of the slurry of treated particles and is generally between 1,000 and 50,000 centipoise. This may depend, at least in part on the specific gravity and/or particle size of the particles dispersed in the slurry. The temperature of the polymer solution is preferably the same as that of the slurry. Further, it is preferred to add the polymer cement in an amount such that the final dried dispersion may contain the treated particulate material as the major component of the composition—i.e., the dispersion comprises at least about 50 percent by weight particulate material. Preferably, the dispersion comprises from about 50 to about 95, more preferably from about 60 to about 95, even more preferably from about 70 to about 95, percent by weight particulate material.

The polymer cement and, optionally, oil and antioxidants, is mixed with the slurry of treated particles until the mixture becomes homogeneous. This is confirmed by assessing the uniformity of colour and/or solids dissolution (i.e., the present of a substantially single phase although a small insubstantial amount of water may separate at this stage).

If not added previously, or if additional amounts are desired, oil and antioxidants may be added next and the mixing continued further until the oil and antioxidant become incorporated in the continuous phase.

Any water which separates from the preblend may be removed, discarded or recycled for slurry make-up by stopping the agitator for a suitable period and allowing the water phase to separate in the mixing tank from which it may be removed prior to proceeding with the next step. Agitation is preferably restarted after the water layer is removed.

If antioxidants and processing oil were not previously added, or if additional amounts are desired, they may be added at this stage and stirred to disperse them.

The preblend is then added to water heated to a temperature equal to, or preferably higher than the boiling point of the solvent used for the polymer cement so as to remove the solvent and produce a dispersion coagulum in the form of a crumb suspended in water. Preferably, the temperature of the water prior to addition of the preblend is in the range of from about 50° C. to about 100° C., more preferably in the range of from about 90° C. and to about 95° C. Further, it is preferred to add the preblend at a rate so as to maintain a temperature substantially within thereof preferred ranges. The agitation is set sufficiently high so as to maintain the crumb in a suspended state within the water, but not so high as to cause the crumb to subdivide into particles smaller than approximately 5 mm.

The solvent may be recovered from the coagulator by condensing the vapours. The material containing the suspended crumb may then be passed through a filter screen sized so as to recover the wet composition. The filtrate from this step may be optionally recycled for further slurry make-up.

The wet crumb is dried such as by using forced air or fluidized bed or microwave or other drying techniques. If microwave or other drying techniques are used, it is preferred to conduct these at a temperature in the range of from about 75° C. to about 135° C., preferably in the range of from about 85° C. to about 120° C., most preferably in the range of from about 85° C. to about 105° C., until a suitably dry dispersion crumb is obtained.

The dried crumb may be further processed according to industry and customer requirements.

Figure 1:
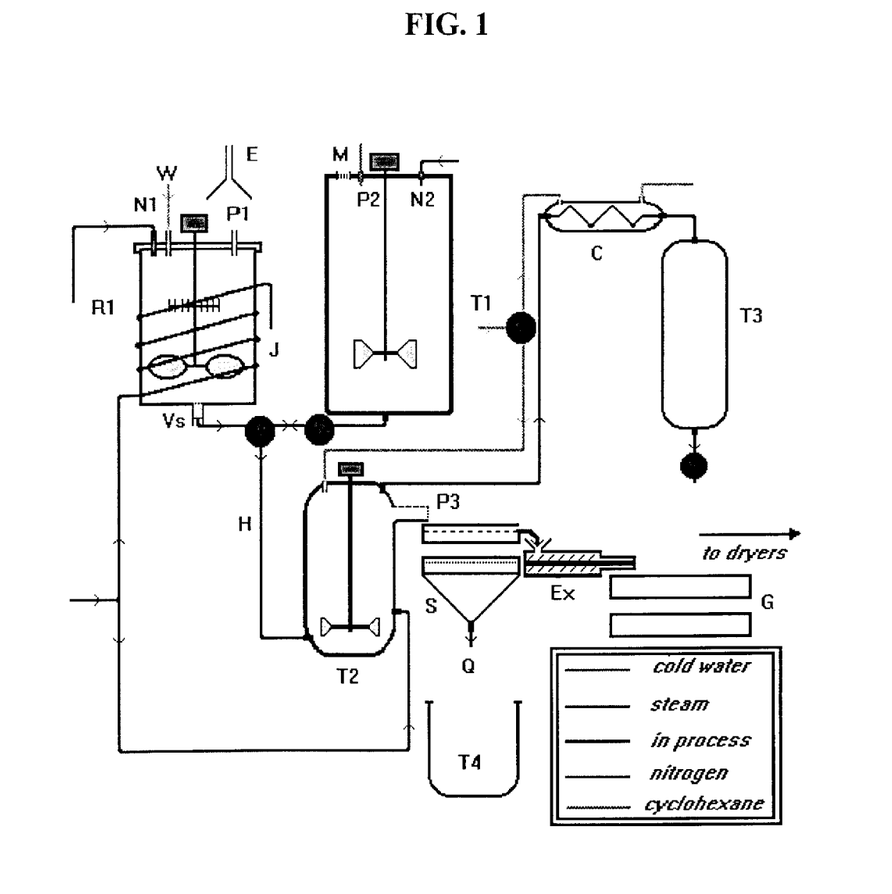
FIG. 1 illustrates a schematic of a system useful to conduct the present process.

In FIG. 1, there is illustrated a schematic drawing of a system suitable for carrying out the process described hereinabove. The legend in FIG. 1 is as follows:

$R^1$ : A balance-mounted portable paint pot of nominal capacity 120 liters. The pot is equipped with a Strahman (piston) bottom valve (Vs), an oversized air-operated motor, one 6-inch radial flow agitator (top) and one 10-inch marine impeller (bottom) on a single shaft, and an external steam coil (J) for heating. The lower impeller has approximately 2 inches of clearance from the bottom of $R^1$; the top impeller is attached at a point 9 inches higher. A valved chemical addition port (P1) is available on the removable lid and the pot may be purged with nitrogen through another port (N1) when transfer of the contents is required. A water line may be coupled to an additional port (W). A portable exhaust snorkel (E) is available in the vicinity to remove fugitive chemical emissions. R1 is used for the slurry makeup and as a vessel to carry out the above-mentioned additions of the compound of Formula I and the coupling agent (if used) to produce a slurry of hydrophobicized particles.

T1: A nominal 500 USG glass-lined chemical reactor used for cement make-up and storage and as a mixing vessel for the slurry of treated particles and polymer cement prior to coagulation. It is equipped with a 200 rpm pneumatic drive, a marine impeller and heating jacket to speed dissolution of polymers. It has various addition ports including: M, a small manhole for introducing polymer, oil or other chemicals; P2, for solvent addition; and a nitrogen line port (N2) for pressure transfer of the contents through a large bottom drain with a valve (V2). The bottom valve is located a short distance from the tank bottom in order to reduce dead space in the piping.

H: Armoured flex hose, 2 inch diameter, for slurry and cement transfers.

V1: A 3-way valve to control the direction of flow.

T2: A steam coagulator of nominal capacity 400 liters. It is equipped with a steam sparge port near the bottom and a connection to service water. An overflow port (P3) and overflow channel are situated close to the top to allow for product discharge. A large pipe at the top directs solvent vapours to a condenser (C). The tank is stirred by means of an air operated motor and an 8-inch diameter marine impeller.

S: A 24-inch diameter Sweco™ shaker screen (100 mesh).

C: A condenser for solvent recovery from coagulation. It is connected to cold process water through a valve (V4).

T3: A solvent decanter, approx. 250 USG, for recycle solvent storage and water separation. A valve (V3) allows for sampling and water discharge.

T4: A 60 liter plastic tank for fines settling.

G: Perforated trays for product dewatering and drying.

Ex: A short (24" long, 3-inch diameter screw) dewatering extruder "Rocket" powered by an explosion proof motor via a variable speed gearbox.

EXAMPLES

Example 1

Antimony Oxide Dispersion in SBR Binder

A binder solution ["cement"] was prepared by dissolving Buna VSL 5025-0 solution SBR (Bayer AG., 84.7 grams) and Sundex 8125 High aromatic process oil (Sun Oil Co., 40.3 grams) in 480 grams of mixed hexanes contained in a 2 L jug. Antimony trioxide (Amspec Chemical Corp. $Sb_2O_3$, 500 grams) and 1 L of water were placed in a 4 L glass beaker. The solid was evenly dispersed by use of mechanical agitation. The resultant slurry was heated to 55° Celsius by means of a hot plate while being continuously agitated.

A solution of N-oleyl-N-(3-trimethoxysilyl)propyl ammonium chloride (5.3 grams) in anhydrous methanol (5.3 grams) was then added to the agitated slurry dropwise over 5 minutes. Sodium hydroxide (0.6 grams) was dissolved in 10 mL of water and the solution was then added to the treated antimony oxide slurry dropwise over 5 minutes.

The antimony oxide slurry was removed from the hot plate and allowed to cool to ambient temperature without stirring. The binder solution was then added to the slurry and the mass was mixed with a spatula for 3 minutes at which point a small amount of clear water separated from the bulk. Stirring was continued for a further 12 minutes. The entire mixture was then added over 30 minutes with vigorous stirring to 10 L of water (maintained at 90–95° C. by means of live steam) in a fume hood in order in order to remove the mixed hexanes. When the material was solvent free, it was allowed to cool to 40° C. and then passed through a 1 mm screen to collect the wet product as a crumb. The coagulation serum (filtrate) was observed to be water white and free of any suspended solids. The wet product crumb was transferred to a forced-air oven thermostatted at 80° C. and dried overnight to yield 615 grams of a tacky dispersion.

Example 2

Titanium Dioxide Dispersion in NBR Binder

A stabilized binder solution ["cement"] was prepared by dissolving Krynac 34:35 acrylonitrile-butadiene copolymer (NBR, Bayer AG., 200 grams), tris(nonylphenyl)phosphite (Polygard 2.1 grams) and Irganox 1076 (Ciba-Geigy 1.0 gram) in 1133.3 grams of toluene in a 2 L jug.

Titanium dioxide (DuPont "Ti-Pure" rutile type, 800 grams), and 1.6 L of water were placed in a 4 L glass beaker. The solid was evenly dispersed by use of mechanical agitation. The resultant slurry was warmed to 35° C. by means of a hot plate while being continuously agitated.

A solution of N-oleyl-N-(3-trimethoxysilyl)propyl ammonium chloride (8.5 grams) in anhydrous methanol (8.5 grams) was then added to the agitated slurry dropwise over 5 minutes. Sodium hydroxide (0.74 grams) was dissolved in 10 mL of water and the solution was then added dropwise to the treated titanium dioxide slurry over 5 minutes.

The slurry was removed from the hot plate and allowed to cool to ambient temperature without stirring. It was then transferred quantitatively to a 6 L stainless steel beaker. The bulk of the binder solution was then added to the slurry. The bottle of the binder solution was then rinsed with 200 mL of toluene and the washings were added to the slurry. The mass was mixed vigorously with an air driven impeller for 15 minutes at which point a small amount of clear water separated from the bulk. Stirring was continued for a further 5 minutes.

The creamy mass from the above was then added over 30 minutes with vigorous stirring to 10 L of water (maintained at 90–95° C. by means of live steam) in a fume hood in order in order to remove the solvent. After solvent removal, the product was allowed to cool to 40° C. and then passed through a 1 mm screen to collect the wet product crumb. The coagulation serum (filtrate) was observed to be crystal clear and free of any suspended solids. The wet product crumb was transferred to a forced-air oven thermostatted at 80° C. and dried to give 1018 grams of a sticky white solid.

Example 3

Iron Oxide Dispersion in FP Binder

A binder mixture was prepared by adding EP306 ethylene-propylene copolymer (Bayer AG., 87 grams), liquid paraffin (heavy mineral oil, U.S.P., 43.0 grams), isostearic acid (Emersol 875-Henkel, 28.45 grams), Bayferrox 720N (red iron oxide pigment, Bayer AG., 5.3 grams) and 493.0 grams of cyclohexane to a 2 L glass bottle and agitating until a homogeneous mixture was obtained.

Bayferrox 720 red iron oxide pigment (Bayer AG., 836.25 grams), and 1673 mL of water were placed in a 6 L stainless steel beaker. The solid was evenly dispersed by use of mechanical agitation. The resultant slurry was warmed to 55° C. by means of a hot plate while being continuously agitated.

A solution of N-oleyl-N-(3-trimethoxysilyl)propyl ammonium chloride (8.5 grams) in anhydrous methanol (8.5 grams) was then added to the agitated slurry dropwise over 5 minutes. Sodium hydroxide (0.74 grams) was dissolved in 10 mL of water and the solution was then added dropwise to the treated pigment slurry over 5 minutes.

The slurry was then removed from the hot plate and allowed to cool to ambient temperature without stirring. The bulk of the binder mixture was then added to the slurry. The bottle of the binder mixture was then rinsed with 200 mL of cyclohexane and the washings were added to the slurry. The mass was mixed vigorously with an air driven impeller for 9 minutes at which point the phases began separating. After a total of 25 minutes of stirring, the phases were completely separated giving a reddish sticky mass and a small amount of crystal-clear aqueous serum.

The total of the above was then added over 30 minutes with vigorous stirring to 10 L of water (maintained at 90–95° C. by means of live steam) in a fume hood in order in order to remove the solvent. When solvent free, it was allowed to cool to room temperature and then passed through a 1 mm screen to collect the wet product crumb. The coagulation serum (filtrate) was observed to be crystal clear, water-white and free of any suspended solids. The moist product crumb was transferred to a forced-air oven thermostatted at 80° C. and dried to give 984 grams of a tacky red solid.

Example 4

Zinc Oxide Dispersion in FP Binder

A binder mixture was prepared by adding EP306 ethylene-propylene copolymer (Bayer AG., 87 grams), Sunthene 310 naphthenic process oil, (Sun Oil, 43.0 grams), isostearic acid (Emersol 875-Henkel, 29.5 grams), French process Zinc Oxide (4.23 grams) and 493.0 grams of cyclohexane to a 2 L glass bottle and agitating until a homogeneous mixture was obtained.

French process Zinc Oxide (837 grams), and 1674 mL of water were placed in a 6 L stainless steel beaker. The solid was evenly dispersed by use of mechanical agitation.

A solution of N-oleyl-N-(3-trimethoxysilyl)propyl ammonium chloride (8.5 grams) in anhydrous methanol (8.5 grams) was then added to the agitated slurry dropwise over 5 minutes. Sodium hydroxide (0.74 grams) was dissolved in 10 mL of water and the solution was then added dropwise to the treated pigment slurry over 5 minutes.

The slurry was stirred for an additional 30 minutes. The bulk of the binder mixture was then added to the slurry. The bottle of the binder mixture was then rinsed with 100 mL. of cyclohexane and the washings were added to the slurry. The mass was mixed vigorously with an air driven impeller for 10 minutes with intermittent manual stirring (spatula) to enhance mixing of the thick paste.

The total of the above was then added over 30 minutes with vigorous stirring to 10 L of water (maintained at 90–95° C. by means of live steam) in a fume hood in order to remove the solvent. When solvent free, the contents of the coagulator were allowed to cool to room temperature and were then passed through a 1 mm screen to collect the wet product crumb. The coagulation serum (filtrate) was observed to be crystal clear, water-white and free of any suspended solids. The moist product crumb was transferred to a forced-air oven thermostatted at 90° C. and dried to give 910 grams of a stiff white paste.

Example 5

Ultramarine Blue Dispersion in EP Binder

Ultramarine Blue pigment (255 grams), and 1020 mL of water were placed in a 4 L glass beaker. The solid was evenly dispersed by use of mechanical agitation. The resultant slurry was heated to 80° C. using a hot plate while under continuous agitation.

A solution of N-oleyl-N-(3-trimethoxysilyl)propyl ammonium chloride (6.38 grams) in anhydrous methanol (6.38 grams) was then added to the agitated slurry in one shot. Sodium hydroxide (0.55 grams) was dissolved in 10 mL of water and the solution was then added dropwise to the treated pigment slurry over 5 minutes. The slurry was then cooled to room temperature.

850 grams of a 10% w/w solution of EP306 ethylene-propylene copolymer (Bayer AG) in cyclohexane was then added to the slurry. It was then mixed with an air driven impeller for several minutes with intermittent manual stirring (spatula) to enhance mixing.

The mixture so-produced was then added over 30 minutes with vigorous stirring to 10 L of water (maintained at 90–95° C. by means of live steam) in a fume hood in order in order to remove the solvent. When solvent free, the contents of the coagulator were allowed to cool to room temperature and were then passed through a 1 mm screen to collect the wet product crumb. The coagulation serum (filtrate) was observed to be crystal clear with just a hint of blue coloration. The moist product crumb was transferred to a forced-air oven thermostatted at 80° C. and dried to give 326 grams of a dark blue friable solid.

Example 6

Red Iron Oxide in EP Binder

Bayferrox 720N Red Iron Oxide pigment (Bayer Ag, 255 grams), and 510 mL of water were placed in a 4 L glass beaker. The solid was evenly dispersed by use of mechanical agitation. The resultant slurry was heated to 60° C. using a hot plate while under continuous agitation.

A solution of N-oleyl-N-(3-trimethoxysilyl)propyl ammonium chloride (6.38 grams) in anhydrous methanol (6.38 grams) was then added to the agitated slurry dropwise over 5 minutes. A distinct decrease in the viscosity of the slurry was noted. Sodium hydroxide (0.55 grams) was dissolved in 10 mL of water and the solution was then added dropwise to the treated pigment slurry over 5 minutes. The slurry thickened as the sodium hydroxide solution was added. The slurry was then cooled to room temperature.

850 grams of a 10% w/w solution of EP306 ethylene-propylene copolymer (Bayer AG) in cyclohexane was then added to the slurry. It was then mixed with an air driven impeller for 5 minutes.

The mixture so-produced was then added over 15 minutes with vigorous stirring to 10 L of water (maintained at 90–95° C. by means of live steam) in a fume hood in order to remove the solvent. There was a distinct tendency to form large lumps during the coagulation which required manual breaking with a spatula. When solvent free, the contents of the coagulator vessel were allowed to cool to room temperature and were then passed through a 1 mm. screen to collect the wet product crumb. The coagulation serum (filtrate) was observed to be clear with only the slightest hint of a red coloration. The moist product crumb was transferred to a forced-air oven thermostatted at 80° C. and dried to give 317 grams of a red tacky solid.

Example 7

Titanium Dioxide in EP Binder

Titanium Dioxide (DuPont "Ti-Pure" rutile type, 255 grams), and 510 mL of water were placed in a 4 L glass beaker. The solid was evenly dispersed by use of mechanical stirring. The resultant slurry was heated to 60° C. using a hot plate while under continuous agitation.

A solution of N-oleyl-N-(3-trimethoxysilyl)propyl ammonium chloride (6.38 grams) in anhydrous methanol (6.38 grams) was then added to the agitated slurry dropwise over 5 minutes. A distinct decrease in the viscosity of the slurry was noted. Sodium hydroxide (0.55 grams) was dissolved in 10 mL of water and the solution was then added dropwise to the treated pigment slurry over 5 minutes. The slurry became very thick as the sodium hydroxide solution was added. The slurry was then cooled to room temperature.

850 grams of a 10% w/w solution of EP306 ethylene-propylene copolymer (Bayer AG) in cyclohexane was then added to the slurry. It was then mixed with an air driven impeller for a total of 5 minutes. A small amount of clear water began separating from the bulk after 2 minutes.

The mixture so produced was then added over 15 minutes with vigorous stirring to 10 L of water (maintained at 90–95° C. by means of live steam) in a fume hood in order in order to remove the solvent. There was a distinct tendency to form fine crumb during the coagulation which required a lowering of the agitator speed. When solvent free, the contents of the coagulator vessel were allowed to cool to room temperature and were then passed through a 1 mm. screen to collect the wet product crumb. The coagulation serum (filtrate) was observed to be clear. The moist product crumb was transferred to a forced-air oven thermostatted at 80° C. and dried to give 326 grams of a white sticky solid.

Example 8

Barium Carbonate in Special Polymeric Binder

Barium carbonate (800 grams), and 1600 mL of water were placed in a 6 L stainless steel beaker. The solid was evenly dispersed by use of mechanical agitation.

A solution of N-oleyl-N-(3-trimethoxysilyl)propyl ammonium chloride (8.5 grams) in anhydrous methanol (8.5 grams) was then added to the agitated slurry dropwise over 5 minutes. A distinct increase in the viscosity of the slurry was noted.

To the above slurry was added the following in the order shown:
- 680 grams of a 10% w/w solution of Hydrin T3100 ECO (Nippon Zeon) in toluene;
- 319 grams of a 10% w/w/solution of EP306 ethylene-propylene copolymer (Bayer AG) in cyclohexane;
- 31.9 grams of chlorinated polyethylene (Tyrin CM 0136);
- 4.0 grams of isostearic acid (Emersol 875, Henkel);
- 8.0 grams of liquid paraffin (Heavy Mineral Oil, U.S.P.); and
- 64.0 grams of chlorinated paraffin wax (Chlorowax 40)

The mixture of slurry and special ingredients was then stirred for 5 minutes with an air-driven impeller. A crystal-clear water phase separated almost immediately from the bulk.

The mixture so-produced was then added over 30 minutes with vigorous stirring to 10 L of water (maintained at 90–95° C. by means of live steam) in a fume hood in order in order to remove the solvents. There was a distinct tendency to form large lumps during the coagulation which required manual breaking with a spatula. When solvent free, the contents of the coagulator vessel were allowed to cool to room temperature and were then passed through a 1 mm. screen to collect the wet product crumb. The coagulation serum (filtrate) was observed to be crystal clear. The moist product crumb was somewhat sticky. It was transferred to a forced-air oven thermostatted at 80° C. and dried to give 1000 grams of a white tacky solid.

Example 9

Zinc Borate Dispersion in EPDM/EVA Binder.

Two separate binder solutions ["cements"] were prepared in 2 L jugs by (1) dissolving EP5465 ethylene-propylene terpolymer (Bayer AG., 110 grams) in 890 grams of cyclohexane and (2) dissolving EVA copolymer (Levaprene 450, Bayer AG, 50 grams) and chlorinated paraffin wax (Chlorowax 40, Oxychem Corp., 40 grams) in 910 grams of toluene.

Zinc Borate (ZB-45; The Polymer Additives Group, 800 grams), and 1200 grams of tap water were placed in a 6 L stainless steel beaker. The contents were stirred and warmed to 50° C. by means of a hot plate. The mixture was then intensively sheared for 5 minutes with a Gifford-Wood homogenizer to ensure even dispersion. The sides of the vessel were washed free of solids using a small quantity (100 mL) of cold water. To the above slurry was added dropwise over 5 minutes 17.0 grams of a 50 wt % solution of N-oleyl-N-(3-trimethoxysilyl)propyl ammonium chloride in anhydrous methanol. The slurry was stirred for an additional 5 minutes and then a solution of 0.55 grams of sodium hydroxide in 10 ml. of water was added to the treated zinc borate slurry dropwise over one minute. The slurry exhibited a marked increase in viscosity after addition of the sodium hydroxide.

The above slurry was then allowed to cool to ambient temperature. The solution of EPDM in cyclohexane was subsequently added to the slurry by pouring directly from the bottle. The EVA/chlorinated paraffin solution in toluene was added in the same fashion. The bottle containing the EPDM was rinsed with 100 grams of cyclohexane and the washings were added to the mixture. The mixture in the steel beaker was then intensively sheared with an air-operated axial impeller at 250 rpm to give a thick paste. No water was observed to separate.

In a fume hood, a low-pressure (15 psi) steam hose was inserted into the vessel and the contents were heated with continuous stirring in order to remove the solvents. Once the odor of solvent was absent, the steam was removed and the material was allowed to cool. The water phase from the coagulation was crystal clear.

The solid crumb was removed by filtering through a 1 mm. screen. It was then transferred to a forced-air oven thermostatted at 90° C. and dried for 6 hours to yield 952 grams of the product in the form of 1–2 mm. easily-deformable white spheroids.

While the present invention has been described with reference to preferred embodiments and illustrative Examples, it will of course be understood by those of skill in the art that various modifications to these preferred embodiment and illustrative Examples may be made without departing from the spirit and scope of the invention. For example, after combination of the aqueous suspension of treated particles and the polymer cement/solution, it is possible to remove the solvent by using a thin film evaporator or a devolatilization extruder (i.e., a device which strips solvent out of polymer without the use of water).

What is claimed is:

1. A process for treating particles to render them hydrophobic, the process comprising the step of:
   contacting the particles with a compound of Formula I:

(I)

or an acid addition or quaternary ammonium salt thereof, in which:
   at least one of $R^1$, $R^2$ and $R^3$ are hydroxyl or hydrolysable groups;
   $R^4$ is a divalent group that is resistant to hydrolysis at the Si—$R^4$ bond;
   $R^5$ is selected from: hydrogen; a $C_{1-40}$ alkyl; a $C_{2-40}$ mono-, di or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;
   $R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 12 carbon atoms in length uninterrupted by any heteroatoms;
   or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6.

2. The process defined in claim 1, wherein each of $R^1$, $R^2$ and $R^3$ is hydroxyl or a hydrolysable group.

3. The process defined in claim 1, wherein the hydrolysable group has the formula $OC_pH_{2p+1}$, where p has a value from 1 to 10.

4. The process defined in claim 1, wherein divalent group $R^4$ has the formula:

in which k, m, n, o and p are all whole numbers and the order of the moieties is not restricted other than neither N nor O is directly bound to Si in the compound of Formula I.

5. The process defined in claim 1, wherein $R^5$ is a $C_{8-20}$ monounsaturated alkenyl group.

6. The process defined in claim 1, wherein $R^5$ a $C_{16-18}$ monounsaturated alkenyl group.

7. The process defined in claim 1, wherein $R^6$ is hydrogen.

8. The process defined in claim 1, wherein $R^5$ is hydrogen and $R^6$ is an alkenyl group selected from the group consisting of soya alkyl, tall oil alkyl, stearyl, tallow alkyl, dihydrogenated tallow alkyl, cocoalkyl, rosin alkyl, palmityl and derivatives of these which include one or more unsaturations.

9. The process defined in claim 1, wherein the compound of Formula I is used in the form of a salt having the formula:

wherein $R^1$, $R^2$, $R^3$, $R^4$, $R^5$ and $R^6$ are as defined above; $R^7$ is selected from: hydrogen, a $C_{1-40}$ alkyl group or $C_{2-40}$ mono-, di- or tri-unsaturated alkenyl group, and X is an anion.

10. The process defined in claim 9, wherein X is selected from the group consisting of acetate, chlorine, bromine and sulphate.

11. The process defined in claim 9, wherein $R^7$ is hydrogen.

12. The process defined in claim 9, wherein the salt of the compound of Formula I is selected from the group consisting of N-oleyl-N-[(3-triethoxysilyl)propyl]ammonium chloride, N-3-aminopropylmethyldiethoxysilane hydrobromide, (aminoethylaminomethyl) phenyltrimethoxysilane hydrochloride, N-[(3-trimethoxysilyl)propyl]-N-methyl, N-N-diallylammonium chloride, N-tetradecyl-N,N-dimehyl-N-[(3-trimethoxysilyl) propyl]ammonium bromide, 3[2-N-benzylaminoethylaminopropyl]trimethoxysilane hydrochloride, N-octadecyl-N,N-dimethyl-N-[(3-trimethoxysilyl)propyl]ammonium bromide, N-[(trimethoxysilyl)propyl]-N-tri(n-butyl)ammonium chloride, N-octadecyl-N-[3-triethoxysilyl)propyl] ammonium chloride, N-2-(vinylbenzylamino)ethyl-3-aminopropyl-trimethoxysilane hydrochloride and mixtures thereof.

13. The process defined in claim 9, wherein the salt of the compound of Formula I is N-octadecyl-N-[(3-trimethoxysilyl)propyl]ammonium chloride.

14. The process defined in claim 1, wherein the particles comprise inorganic water insoluble compounds.

15. The process defined in claim 14, wherein the inorganic water insoluble compounds comprise compounds which contain oxygen.

16. The process defined in claim 14, wherein the inorganic water insoluble compounds comprise compounds which contain oxygen and a metal.

17. The process defined in claim 16, wherein the metal is selected from Groups II–VIII of the Periodic Table of Elements.

18. The process defined in claim 14, wherein the inorganic water insoluble compound is selected from Group II hydroxide and carbonate compounds.

19. The process defined in claim 14, wherein the inorganic water insoluble compound is a metal containing compound selected from the group consisting of oxides, hydroxides, borates, sulfates, carbonates, silicates, phosphates, chromates and mixtures thereof.

20. The process defined in claim 1, wherein the particles are selected from the group consisting of titanium oxide, ferric oxide, hydrated ferric oxide, ferrous oxide, antimony oxide, barium carbonate, zinc oxide, zinc borate, lead oxide (including red lead oxide), dibasic lead phosphite, lead silicate, tribasic lead sulfate and mixtures thereof.

21. The process defined in claim 1, wherein the amount of the compound of Formula I used is in the range of from about 0.1 and to about 20 percent by weight of the particles.

22. The process defined in claim 1, comprising the further step of:
admixing the treated particles with a polymer solution and forming the mixture into a polymer dispersion.

23. The process defined in claim 1, comprising the further step of:
admixing a slurry of treated particles with a polymer solution and forming the mixture into a polymer dispersion.

24. The process defined in claim 23, wherein the polymer solution comprises a polymer and a solvent.

25. The process defined in claim 24, wherein the polymer is selected from the group consisting of an elastomer, a graft polymer or block polymer of monomers having at least one ethylenically unsaturated bond and polymerizable through this unsaturation, a plastic and mixtures thereof.

26. The process defined in claim 25, wherein the elastomer is selected from the group consisting of natural rubber (NR), cis-1,4-polyisoprene rubber (IR), polybutadiene rubber (BR), styrene-butadiene rubber (SBR), acrylonitrile-butadiene rubber (NBR), hydrogenated acrylonitrile-butadiene rubber (HNBR), butyl rubber (IIR), halogenated butyl rubber (HIIR), ethylene-propylene monomer (EPM) rubber, ethylene-propylene-diene monomer (EPDM) rubber, chloroprene rubber (CR), ethylene-vinyl acetate (EVM) rubber, silicone rubber (Q), epichlorohydrin (ECO) rubber, urethane rubber (AU EU) and mixtures thereof.

27. The process defined in claim 25, wherein the plastic is selected from the group consisting of polystyrene, polyethylene, polypropylene, chlorinated polyethylene, acrylonitrile-butadiene-styrene (ABS) polymers, ethylene-vinyl-acetate (EVA) plastic, polyvinyl chloride (PVC), plasticized polyvinyl chloride (PVC), polymethylmethacrylate (PMMA), epichlorohydrin (ECO) plastic and mixtures thereof.

28. The process defined in claim 24, wherein the solvent is substantially immiscible with water.

29. The process defined in claim 24, wherein the solvent is selected from the group consisting of cyclohexane, chlorobenzene, hexane, benzene, toluene, pentane and mixtures thereof.

30. A polymer dispersion produced by a process comprising the steps of:

contacting the particles with a compound of Formula I:

(I)

or an acid addition or quaternary ammonium salt thereof, in which:

at least one of $R^1$, $R^2$ and $R^3$ are hydroxyl or hydrolysable groups;

$R^4$ is a divalent group that is resistant to hydrolysis at the Si—$R^4$ bond;

$R^5$ is selected from: hydrogen; a $C_{1-40}$ alkyl; a $C_{2-40}$ mono-, di- or tri-unsaturated alkenyl group; a $C_{6-40}$ aryl group; a group of the formula:

in which x is an integer from 2 to 10, $R^8$ and $R^9$ which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 12 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6;

admixing the treated particles with a polymer solution to form the polymer dispersion.

31. A treated particulate material comprising particles having bound thereto an aminohydrocarbonsiloxane moiety comprising both silicon and nitrogen.

32. The treated particulate material defined in claim 31, wherein the aminohydrocarbonsilane moiety has the formula in which:

$R^a$, $R^b$ and $R^c$ are the same or different and each is selected from —O— and —$C_pH_{2p}$—, optionally substituted by one or more oxygen atoms and wherein p is an integer from 1 to 10; and

$R^{12}$ is a group of formula:

or an acid addition or quaternary ammonium salt thereof in which:

$R^4$ is a divalent group that is resistant to hydrolysis at the Si—$R^4$ bond;

$R^5$ is selected from: hydrogen; a $C_{1-40}$ alkyl; a $C_{2-40}$ mono-, di- or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 12 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_{6-40}$ aryl group, an oxygen atom and a sulfur atom, and t and v are each independently 1, 2, 3 or 4; provided that the sum of t and v does not exceed 6.

33. A treated particulate material comprising particles having bound thereto an aminohydrocarbon siloxane moiety comprising both silicon and nitrogen produced by a process comprising the step of contacting the particles with a compound of Formula I:

(I)

or an acid addition or quaternary ammonium salt thereof, in which:

at least one of $R^1$, $R^2$ and $R^3$ are hydroxyl or hydrolysable groups;

$R^4$ is a divalent group that is resistant to hydrolysis at the Si—$R^4$ bond;

$R^5$ is selected from: hydrogen; a $C_{1-40}$ alkyl; a $C_{2-40}$ mono-, di or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;

$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 12 carbon atoms in length uninterrupted by any heteroatoms;

or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6.

34. The treated particulate material defined in claim 33, wherein $R^5$ is hydrogen and $R^6$ is an alkenyl group selected from the group consisting of soya alkyl, tall oil alkyl, stearyl, tallow alkyl, dihydrogenated tallow alkyl, cocoalkyl, rosin alkyl, palmityl and derivatives of these which include one or more unsaturations.

35. The treated particulate material defined in claim 33, wherein the compound of Formula I is used in the form of a salt having the formula:

wherein $R^1$, $R^2$, $R^3$, $R^4$, $R^5$ and $R^6$ are as defined above; $R^7$ is selected from hydrogen, a $C_{1-40}$ alkyl group or $C_{2-40}$ mono-, di- or tri-unsaturated alkenyl group, and X is an anion.

36. The treated particulate material defined in claim 35, wherein the salt of the compound of Formula I is selected from the group consisting of N-oleyl-N-[(3-triethoxysilyl) propyl]ammonium chloride, N-3-aminopropylmethyldiethoxy-silane hydrobromide, (aminoethylamino-methyl)phenyltrimethoxysilane hydrochloride, N-[(3 -trimethoxysilyl)propyl]-N-methyl, N-N-diallylammonium chloride, N-tetradecyl-N,N-dimethyl-N-[(3-trimethoxysilyl)propyl]ammonium bromide, 3[2-N-benzylaminoethyl-aminopropyl] trimethoxysilane hydrochloride, N-octadecyl-N,N-dimethyl-N-[(3-trimethoxysilyl)propyl]ammonium bromide, N-[(trimethoxysilyl)propyl]-N-tri(n-butyl) ammonium chloride, N-octadecyl-N-[3-triethoxysilyl) propyl]ammonium chloride, N-2-(vinylbenzylamino)ethyl-3-aminopropyl-trimethoxysilane hydrochloride and mixtures thereof.

37. The treated particulate material defined in claim 35, wherein the salt of the compound of Formula I is N-octadecyl-N-[(3-trimethoxysilyl)propyl]ammonium chloride.

38. A polymer dispersion comprising a polymer and treated particulate material;
wherein the treated particulate material comprises particles having bound thereto an aminohydrocarbonsiloxane moiety comprising both silicon and nitrogen.

39. The polymer dispersion defined in claim 38, wherein the aminohydrocarbonsilane moiety has the formula in which:
$R^a$, $R^b$ and $R^c$ are the same or different and each is selected from —O— and —$C_pH_{2p}$—, optionally substituted by one or more oxygen atoms and wherein p is an integer from 1 to 10; and
$R^{12}$ is a group of formula:

or an acid addition or quaternary ammonium salt thereof in which:
$R^4$ is a divalent group that is resistant to hydrolysis at the Si—$R^4$ bond;
$R^5$ is selected from: hydrogen; a $C_{1-40}$ alkyl; a $C_{2-40}$ mono-, di- or tri-unsaturated alkenyl group; a $C_6$–$C_{40}$ aryl group; a group of the formula:

in which x is an integer from 2 to 10, $R^8$ and $R^9$, which may be the same or different, are each selected from: hydrogen; $C_{1-18}$ alkyl; $C_{2-18}$ mono-, di- or tri-unsaturated alkenyl; phenyl; a group of formula:

wherein b is an integer from 1 to 10; a group of formula:

wherein c is an integer from 1 to 10, and $R^{10}$ and $R^{11}$ may be the same or different and are each selected from: hydrogen, $C_{1-10}$ alkyl group or $C_{2-10}$ alkenyl group, provided that there is no double bond in the position alpha to the nitrogen atom; and a group of formula:

wherein r is an integer from 1 to 6 and d is an integer from 1 to 4;
$R^6$ may be any of the groups defined for $R^5$ with the provisos that: (i) $R^5$ and $R^6$ do not have a tertiary carbon atom adjacent to the nitrogen atom, and (ii) at least one of $R^5$ and $R^6$ has a carbon chain at least 12 carbon atoms in length uninterrupted by any heteroatoms;
or $R^5$ and $R^6$ may together form a divalent group of formula:

in which A is selected from: a —CHR group or a —NR group in which R is hydrogen or a $C_{6-40}$ alkyl or $C_{6-40}$ alkenyl group, a $C_6$–$C_{40}$ aryl group, an oxygen atom and a sulfur atom, and t and v are each independently 1, 2, 3 or 4; provided that the sum of t and v does not exceed 6.

40. The polymer dispersion defined in claim 39, wherein the material has a contact angle of at least about 100°.

41. The polymer dispersion defined in claim 39, wherein the material has a contact angle of at least about 110°.

42. The polymer dispersion defined in claim 39, wherein the polymer is selected from the group consisting of an elastomer, a graft polymer or block polymer of monomers having at least one ethylenically unsaturated bond and polymerizable through this unsaturation, a plastic and mixtures thereof.

43. The polymer dispersion defined in claim 42, wherein the elastomer is selected from the group consisting of natural rubber (NR), depolymerized NR, cis-1,4-polyisoprene rubber (IR), polybutadiene rubber (BR), styrene-butadiene rubber (SBR), acrylonitrile-butadiene rubber (NBR), hydrogenated acrylonitrile-butadiene rubber (HNBR), butyl rubber (IIR), halogenated butyl rubber (HIIR), ethylene-propylene monomer (EPM) rubber, ethylene-propylene-diene monomer (EPDM) rubber, chloroprene rubber (CR), ethylene-vinyl acetate (EVM) rubber, silicone rubber (Q), epichlorohydrin (ECO) rubber, urethane rubber (AU EU) and mixtures thereof.

44. The polymer dispersion defined in claim 43, wherein the plastic is selected from the group consisting of polystyrene, polyethylene, polypropylene, epichlorohydrin (ECO) plastic, chlorinated polyethylene, acrylonitrile-butadiene-styrene (ABS) polymers, ethylene-vinyl-acetate (EVA) plastic, polyvinyl chloride (PVC), plasticized polyvinyl chloride (PVC), polymethylmethacrylate (PMMA) and mixtures thereof.

* * * * *